(12) United States Patent
Freeman et al.

(10) Patent No.: US 10,268,177 B2
(45) Date of Patent: Apr. 23, 2019

(54) METHOD AND APPARATUS OF COORDINATING INDEPENDENT AUTOMATED SYSTEMS

(71) Applicant: The Boeing Company, Chicago, IL (US)

(72) Inventors: Philip L. Freeman, Summerville, SC (US); Trent T. Weiss, Charleston, SC (US); Shubang Sridhar, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 15/158,880

(22) Filed: May 19, 2016

(65) Prior Publication Data

US 2017/0336774 A1    Nov. 23, 2017

(51) Int. Cl.
*G05B 19/00* (2006.01)
*G05B 19/402* (2006.01)
(Continued)

(52) U.S. Cl.
CPC .......... *G05B 19/402* (2013.01); *B25J 9/1682* (2013.01); *G05B 11/01* (2013.01);
(Continued)

(58) Field of Classification Search
CPC ................. G05B 19/402; G05B 11/01; G05B 2219/39139; G05B 2219/45064;
(Continued)

(56) References Cited

U.S. PATENT DOCUMENTS

| 6,330,493 B1 * | 12/2001 | Takahashi .............. B25J 9/1682 700/245 |
| 2004/0030453 A1 * | 2/2004 | Graf ....................... B25J 9/1669 700/245 |

(Continued)

FOREIGN PATENT DOCUMENTS

EP    1090722    4/2001

OTHER PUBLICATIONS

European Extended Search Report, European Application No. 17160659.3, dated Sep. 7, 2017.
(Continued)

*Primary Examiner* — Christopher E. Everett
(74) *Attorney, Agent, or Firm* — Perman & Green, LLP

(57) ABSTRACT

A method of coordinating automated systems, the method includes providing a first automated system that is programmed with a set of predetermined operating instructions that correspond with automated system processing requirements, monitoring an operational status of the first automated system with a second automated system, automatically generating a second system action, with the second automated system, that is complementary to a first system action of the first automated system, where the first system action corresponds to the set of predetermined operating instructions and the second system action depends on the operational status of the first automated system, and performing the second system action with the second automated system so that the second automated system cooperates with the first automated system to perform a predetermined operation.

20 Claims, 5 Drawing Sheets

(51) Int. Cl.
*G05B 11/01* (2006.01)
*B25J 9/16* (2006.01)

(52) U.S. Cl.
CPC .............. *G05B 2219/32085* (2013.01); *G05B 2219/32285* (2013.01); *G05B 2219/39109* (2013.01); *G05B 2219/39122* (2013.01); *G05B 2219/39129* (2013.01); *G05B 2219/39139* (2013.01); *G05B 2219/39141* (2013.01); *G05B 2219/39146* (2013.01); *G05B 2219/39149* (2013.01); *G05B 2219/40032* (2013.01); *G05B 2219/40394* (2013.01); *G05B 2219/40512* (2013.01); *G05B 2219/45064* (2013.01); *G05B 2219/45071* (2013.01); *G05B 2219/50047* (2013.01); *G05B 2219/50049* (2013.01); *Y02P 90/24* (2015.11)

(58) Field of Classification Search
CPC .......... G05B 2219/40394; G05B 2219/40032; G05B 2219/39149; G05B 2219/39146; G05B 2219/50047; G05B 2219/40512; G05B 2219/39129; G05B 2219/39122; G05B 2219/39109; G05B 2219/32285; G05B 2219/45071; G05B 2219/50049; G05B 2219/39141; B25J 9/1682
See application file for complete search history.

(56) References Cited

U.S. PATENT DOCUMENTS

| | | | | |
|---|---|---|---|---|
| 2004/0068348 | A1* | 4/2004 | Jager | G05D 1/0295 700/255 |
| 2005/0055132 | A1* | 3/2005 | Matsumoto | B25J 9/1682 700/245 |
| 2006/0287769 | A1 | 12/2006 | Yanagita et al. | |
| 2007/0050085 | A1* | 3/2007 | Hashimoto | B25J 9/1682 700/245 |
| 2010/0204824 | A1* | 8/2010 | Luce | B25J 9/1687 700/219 |
| 2011/0066282 | A1 | 3/2011 | Bosscher et al. | |
| 2012/0116585 | A1* | 5/2012 | Yoshima | B23K 9/1062 700/248 |
| 2014/0114476 | A1* | 4/2014 | Maeda | G05B 19/418 700/248 |
| 2014/0309762 | A1 | 10/2014 | Hayata et al. | |
| 2015/0336269 | A1* | 11/2015 | Linnell | B25J 9/1656 700/245 |
| 2016/0023355 | A1* | 1/2016 | Komatsu | B25J 9/1682 700/248 |
| 2016/0124412 | A1* | 5/2016 | Fujita | H04L 12/40019 700/3 |
| 2016/0158940 | A1* | 6/2016 | Brockway | B25J 9/1687 700/114 |

OTHER PUBLICATIONS

Morel, Mary Kay. "Programming Multiple Robots; Operating two or more robots from a single point of control" https://www.thefabricator.com/article/automationrobotics/programming-multiple-robots The Fabricators and Manufactureres Association, Intl, The Fabricator, Issue 92, Oct. 2003.

LaValle, Steven. "Rapidly-Exploring Random Trees; A New Tool for Path Planning". Department of Computer Science, Iowa State University, Jul. 1999.

Knepper, et al. "IkeaBot: An Autonomous Multi-Robot Coordinated Furniture Assembly System". IEEE Robotics and Automation (ICRA), 2013 Conference. May 2013.

Kalakrishnan, et al. "STOMP: Stochastic Trajectory Optimization for Motion Planning". IEEE Robotics and Automation (ICRA) 2011 Conference, May 2011.

* cited by examiner

METHOD AND APPARATUS OF COORDINATING INDEPENDENT AUTOMATED SYSTEMS

BACKGROUND

Generally, where multiple automated systems are used for a common operation, each robotic system is programmed with an explicit set of instructions for performing the common operation. For example, multiple automated systems are often used to perform an assembly task where the multiple automated systems cooperate with each other to perform the assembly task. Generally, a supervisory controller is used where the supervisory controller is programmed with all of the instructions for all of the multiple automated systems and dispatches the instructions to each of the multiple automated systems. The supervisory controller coordinates the execution of the instructions to keep the automated systems synchronized however, the supervisory controller adds a layer of complexity to the automated system without decreasing an amount of programming needed to operate the automated system.

Generally, where a supervisory controller is not used, detailed programs are written for each operation of each of the multiple automated systems where the respective detailed programs synchronize the operations of one automated system with another automated system. This approach requires extensive programming and if something happens where one automated system fails to perform a task, there is no simple way for the other automated systems to change their programming to accommodate the failure. For example, if one robot is programmed to drill a hole and install a bolt into the hole but fails to do so, another robot that is supposed to install a nut onto the bolt may then try and install the nut in accordance with the other robots programming. The attempt to install the nut would generate an error because there is no bolt to receive the nut.

In both cases, i.e. where the supervisory controller is used and where detailed programs are written for each automated system, it takes considerable effort to program all of the actions of each automated system, and then ensure that the actions between the automated systems are synchronized. Further, in conventional automated systems where multiple automated systems are used for a common operation, if the programming for one of the automated system is changed the programming for the other cooperating automated systems must be rewritten accordingly (e.g. the cooperating automated systems must be explicitly reprogrammed to match the new instructions) which takes additional effort and time, which in turn contributes to increased down-time (e.g. time the multiple automated systems are not in use) and decreased production.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a method of coordinating automated systems. The method includes providing a first automated system that is programmed with a set of predetermined operating instructions that correspond with automated system processing requirements, monitoring an operational status of the first automated system with a second automated system, automatically generating a second system action, with the second automated system, that is complementary to a first system action of the first automated system, where the first system action corresponds to the set of predetermined operating instructions and the second system action depends on the operational status of the first automated system, and performing the second system action with the second automated system so that the second automated system cooperates with the first automated system to perform a predetermined operation.

Another example of the subject matter according to the present disclosure relates to a coordinated automated system comprising a first automated system having a controller that is programmed with a set of predetermined operating instructions that correspond with automated system processing requirements, and a second automated system having a controller configured to monitor an operational status of the first automated system, automatically generate a second system action that is complementary to a first system action of the first automated system, where the first system action corresponds to the set of predetermined operating instructions and the second system action depends on the operational status of the first automated system, and effect operation of the second automated system so that the second automated system cooperates with the first automated system to perform a predetermined operation.

Still another example of the subject matter according to the present disclosure relates to an automated assembly system comprising a first automated system having a controller that is programmed with a set of predetermined operating instructions that correspond with automated assembly requirements, and a second automated system having a controller configured to monitor an operational status of the first automated system, automatically generate a second system action that is complementary to a first system action of the first automated system, where the first system action corresponds to the set of predetermined operating instructions and the second system action depends on the operational status of the first automated system, and effect operation of the second automated system so that the second automated system cooperates with the first automated system to perform a predetermined assembly operation.

BRIEF DESCRIPTION OF THE DRAWINGS

Figure 1:
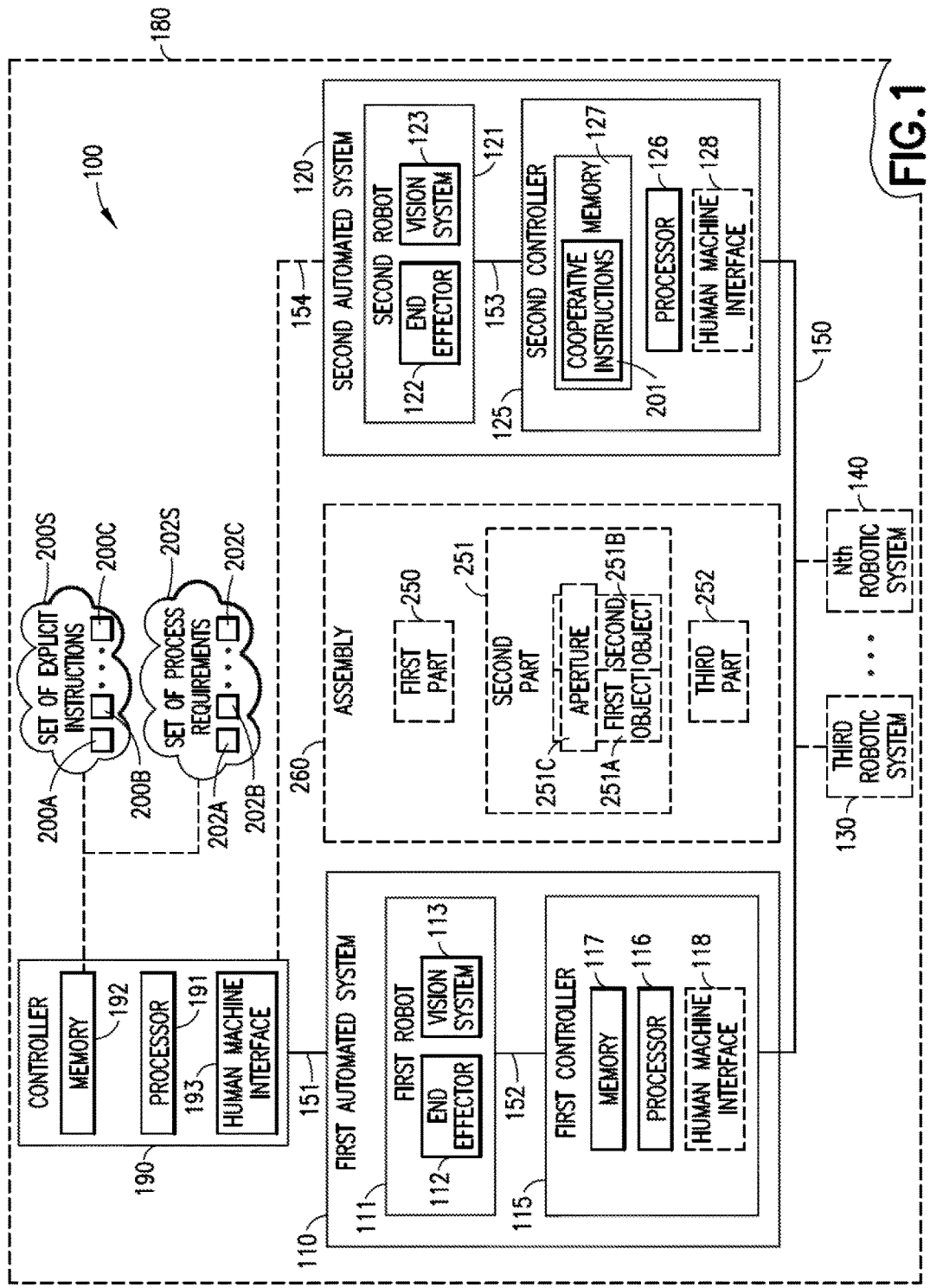
Figure 2:
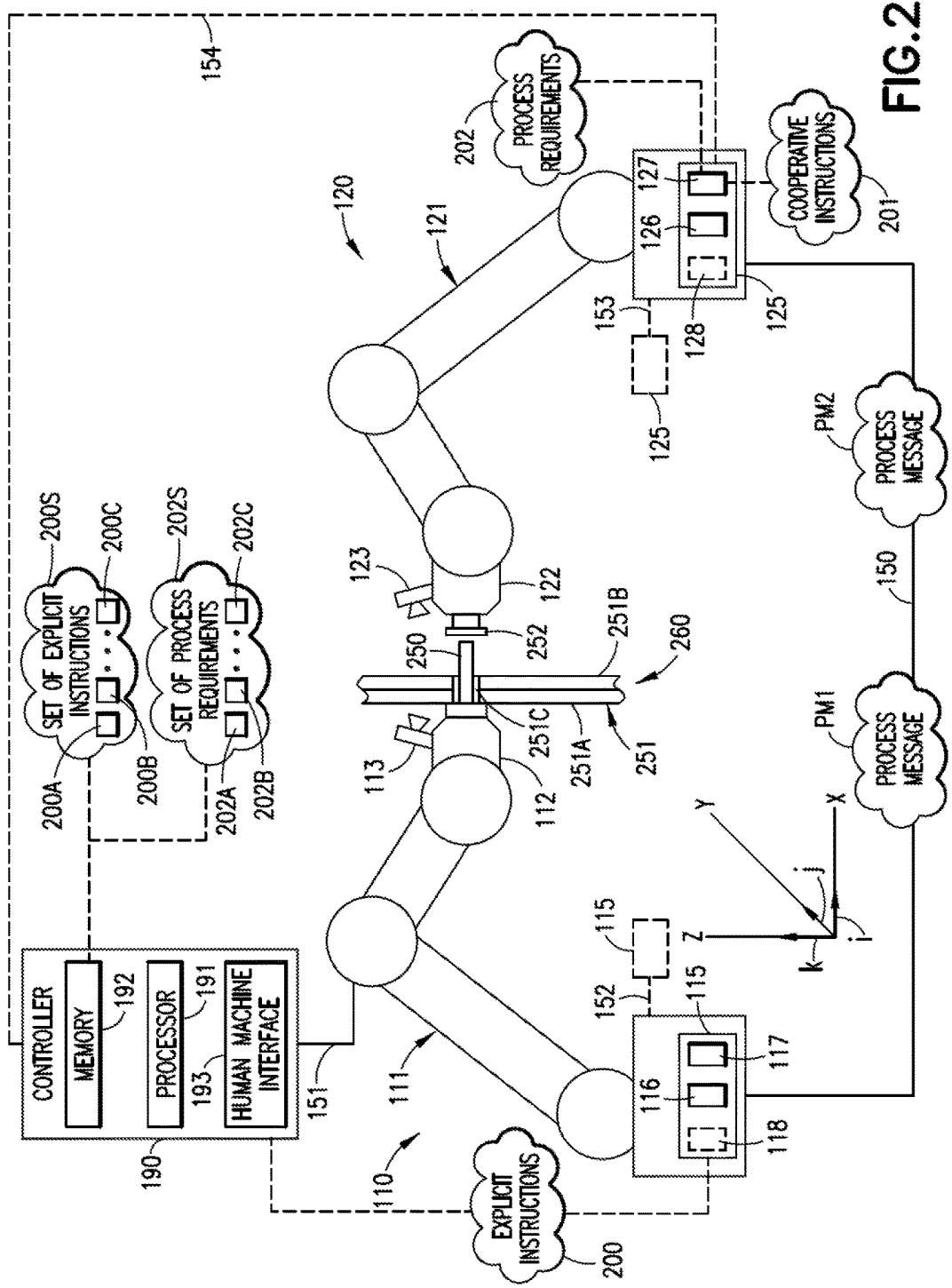
Figure 3:
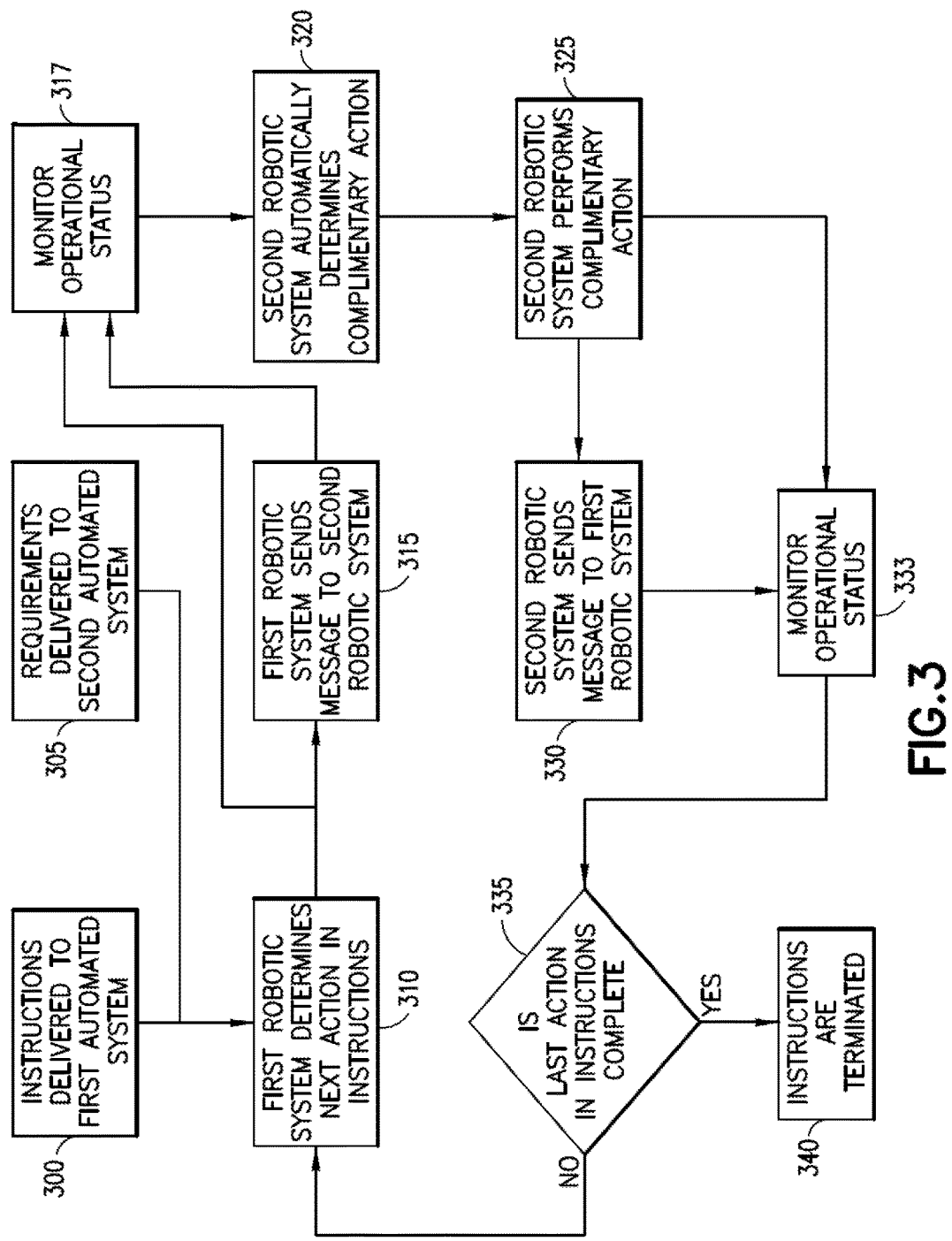
Figure 4:
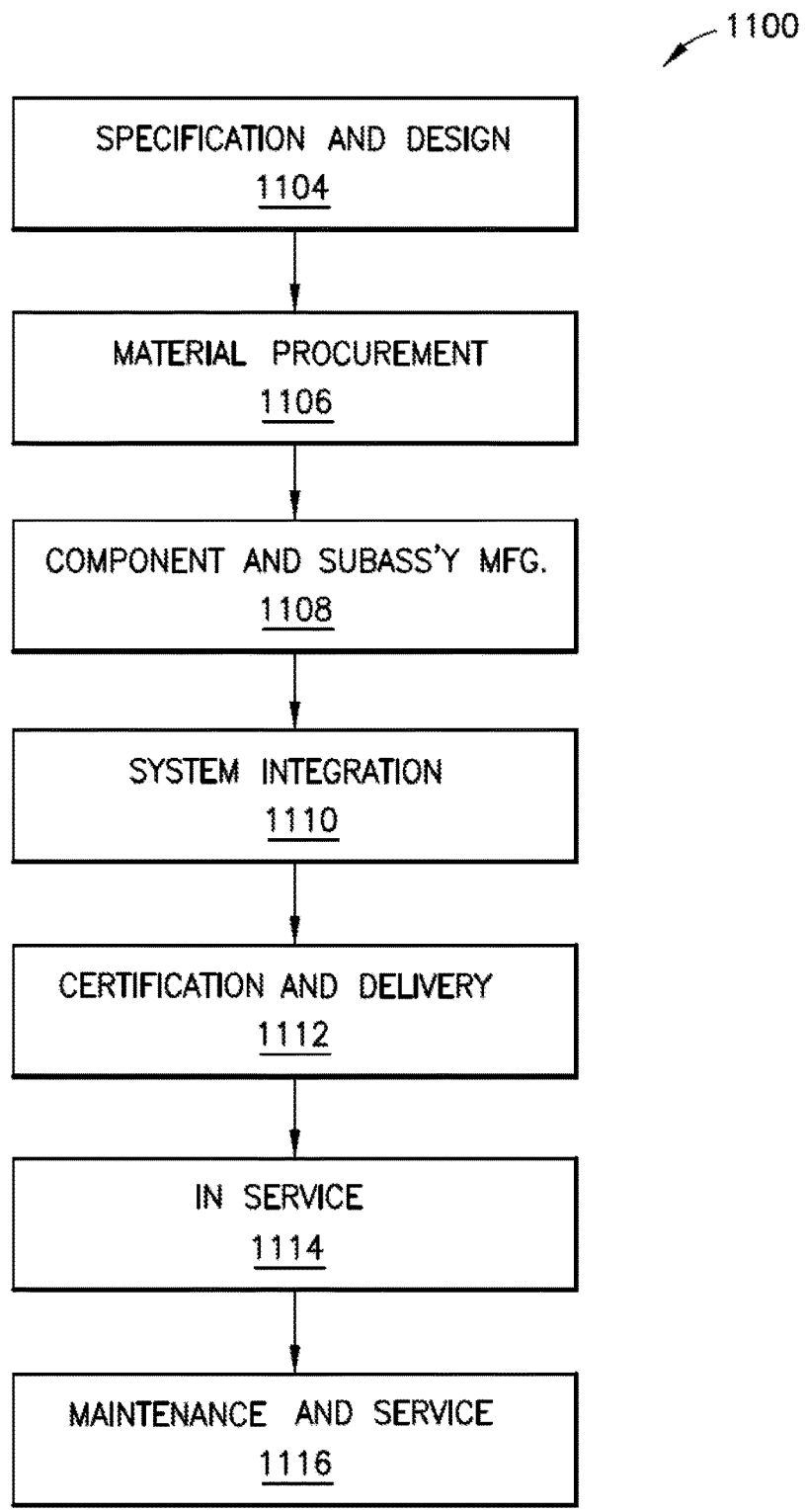

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of an apparatus for coordinating independent automated systems, according to one or more aspects of the present disclosure;

FIG. 2 is a schematic illustration of an apparatus for coordinating independent automated systems, according to one or more aspects of the present disclosure;

FIG. 3 is a flow diagram of a method, according to one or more aspects of the present disclosure;

FIG. 4 is a block diagram of aircraft production and service methodology; and

Figure 5:
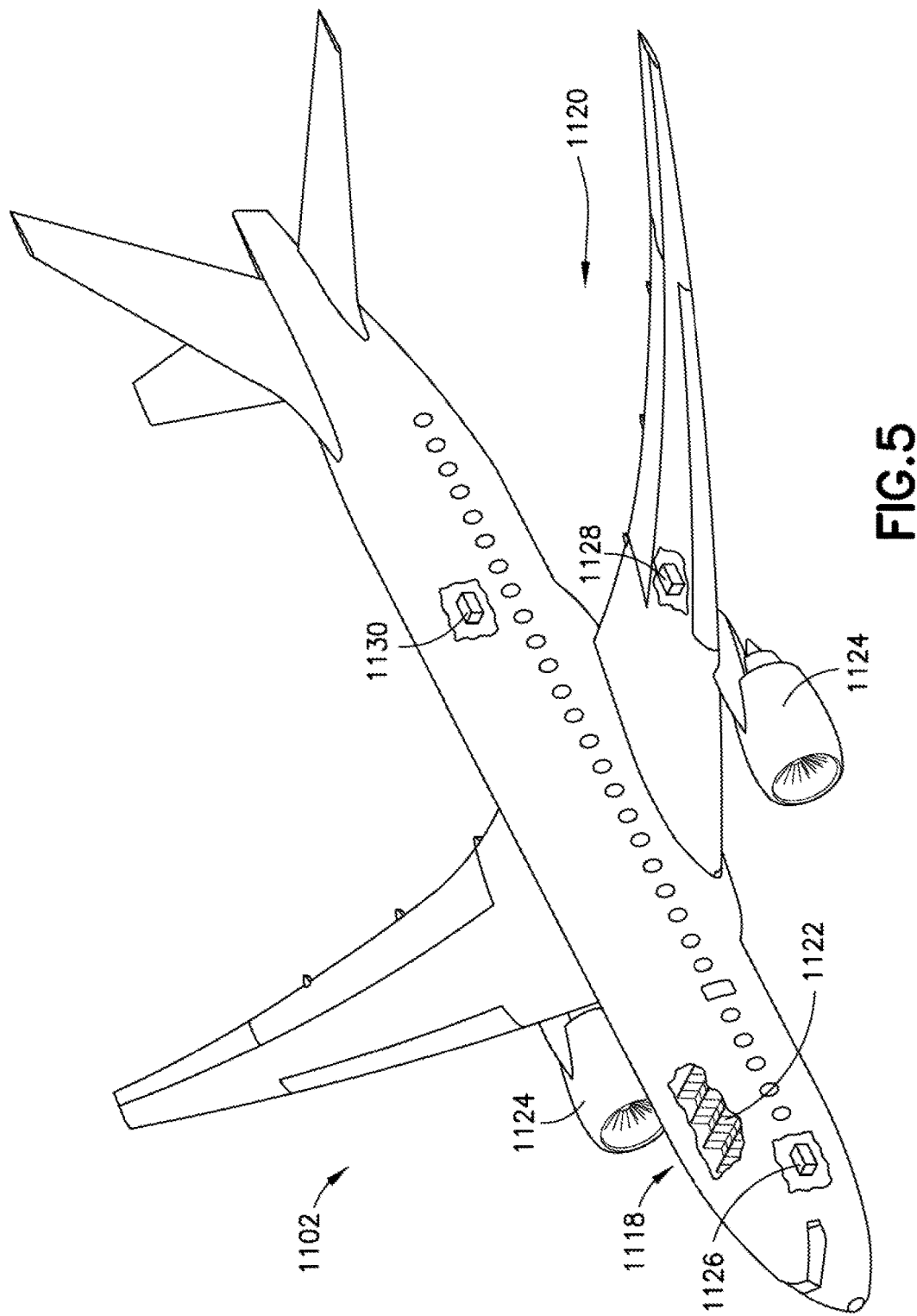

FIG. 5 is a schematic illustration of an aircraft.

DETAILED DESCRIPTION

In FIG. 1, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1, may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 3 and 4, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring to FIG. 1 an apparatus 100 for coordinating independent automated systems is illustrated. The apparatus 100 and methods described herein provide for the coordination of multiple independent automated systems that work in concert to complete a common task/operation, such as an assembly operation or other suitable task including but not limited to tasks for subassembly manufacturing, system integration, in service operations and routine maintenance and service for an aircraft 1102 as described herein with respect to aircraft manufacturing and service method 1100 shown in FIG. 4. At least one of the multiple automated systems is programmed with explicit (e.g. operating/operational) instructions (e.g. motion paths, coordinates and vectors corresponding to tasks, a sequencing of tasks, etc.) to complete the common task, and at least one cooperating automated system automatically coordinates actions/operations of the at least one cooperating system with the actions of the explicitly programmed system(s). In the aspects of the present disclosure the at least one cooperating automated system is unaware of a sequence of tasks corresponding to the explicitly programmed instructions and does not use a pre-scripted motion plan when automatically coordinating the actions of the at least one cooperating automated system with the actions of the explicitly programmed automated system. In accordance with the present disclosure status messages are passed between the automated systems to where the status message synchronize the actions/operations of the automated systems and to cause a progression through a predetermined set of explicit instructions by a first automated system in response to status messages passed from the second automated system to the first automated system.

In one aspect, referring to FIGS. 1 and 2, the apparatus 100 includes at least a first automated system 110 and a second automated system 120 in communication with each other over any suitable wired or wireless communication link 150. The apparatus also includes a controller 190 in communication with at least the first automated system 110 over any suitable wired or wireless communication link 151. The controller 190 is, in one aspect, a cell controller of an automated assembly cell 180 or, in other aspects, any suitable controller such as a warehouse controller, a manufacturing cell controller, etc. In one aspect, the controller 190 includes a processor 191 and a memory 192 that are configured to perform the aspects of the present disclosure described herein. In one aspect, the controller 190 also includes a human to machine interface 193 that provides an interface for human programming and/or operation of the controller 190.

The first automated system 110 is, in one aspect, an explicitly programmed automated system that includes explicit (e.g. operating) instructions 200 for performing a task, where the explicit instructions 200 include a complete manufacturing plan and correspond with automated system processing requirements. The first automated system 110 includes a first robot 111 and a first controller 115. The first robot 111 may be for example, an articulated robot, a SCARA (selectively compliant articulated robot arm) robot, a Cartesian robot, a delta robot, a cylindrical robot, a polar robot or any other suitable type of robot having a movable end effector 112 that is configured to interface with or otherwise manipulate one or more objects for performing the task in accordance with the explicit instructions 200. In one aspect, the first robot 111 includes any suitable object detection system such as, for example, a vision system 113 that is configured to effect recognition of objects for performing the task in accordance with the explicit instructions 200.

In one aspect, the first controller 115 is in communication with the first robot 111 over any suitable wired or wireless communication link 152. In other aspects, the first controller 115 may be integrated with the first robot 111, as illustrated in FIG. 2. While FIG. 2 illustrates the first controller 115 being integrated with the first robot 111, it should be understood that, in other aspects, the system shown in FIG. 2 may include the first controller 115 being connected to the first robot 111 through communication link 152 (as shown in dashed lines in FIG. 2). The first controller 115 includes a processor 116 and memory 117 that are configured to perform the aspects of the present disclosure described herein. In one aspect, the first controller 115 may also include a human machine interface 118 that is similar to human machine interface 193 described above. In one aspect, the first controller 115 is configured to receive the explicit instructions 200 from the controller 190 for performing the task and then command the first robot 111 for execution of the explicit instructions 200. In one aspect, the controller 190 may also provide the first automated system 110 with predetermined quality measures and an identification of the part (e.g. aircraft, vehicle, component, etc.) being worked on.

The second automated system 120 is, in one aspect, a cooperating automated system that operates free from (e.g. without) any explicit instructions for performing cooperative tasks that correspond with the tasks of the first automated system 110. In one aspect, the second automated system 120 may be similar to the first automated system 110 however, in other aspects the second automated system 120 may be different than the first automated system 110, such as by the inclusion of a different type/configuration of robot, a different type/configuration of end effector, etc. In one aspect, the second automated system 120 includes a second robot 121 and a second controller 125. The second robot 121 may be for example, an articulated robot, a SCARA (selectively compliant articulated robot arm) robot, a Cartesian robot, a delta robot, a cylindrical robot, a polar robot or any other suitable robot having a movable end effector 122 that is configured to interface with or otherwise manipulate one or more objects for performing the task according to automatically generated cooperative instructions that are generated by, for example the second controller 125. In one aspect, the second robot 121 includes any suitable object detection system such as, for example, a vision system 123 that is configured to effect recognition of objects for performing the task in accordance with the cooperative instructions 201.

In one aspect, the second controller 125 is in communication with the second robot 121 over any suitable wired or wireless communication link 153. In other aspects, the second controller 125 may be integrated with the second robot 121, as illustrated in FIG. 2. While FIG. 2 illustrates the second controller 125 being integrated with the second robot 121, it should be understood that, in other aspects, the system shown in FIG. 2 may include the second controller 125 being connected to the second robot 121 through communication link 153 (as shown in dashed lines in FIG. 2). The second controller 125 includes a processor 126 and memory 127 that are configured to perform the aspects of the present disclosure described herein. In one aspect, the second controller 125 may also include a human machine interface 128 that is similar to human machine interface 193 described above. In one aspect, the second controller 125 is configured to automatically generate the cooperative instructions 201 for performing a cooperative task that corresponds with the task of the first automated system 110. The second controller 125 is also configured to command the second robot 121 for execution of the cooperative instructions 201. In one aspect, as described in greater detail herein, the second controller 125 is configured to monitor an operational status of the first automated system 110, generate a second system action that is complementary to a first system action of the first automated system 110, and effect operation of the second automated system 120 so that the second automated system 120 cooperates with the first automated system 110 to perform a predetermined operation. In one aspect, the first system action corresponds to the set of predetermined explicit instructions and the second system action depends on the operational status of the first automated system 110 that is perceived by the second automated system 120 through the passage of messages between the first automated system 110 and the second automated system 120 as described herein.

Referring again to FIG. 1, in other aspects, the apparatus 100 includes any suitable number of automated systems 110, 120, 130, 140 (see the first through the Nth automated systems) that cooperate with each other to perform any suitable predetermined task(s)/operation(s). In one aspect, at least one of the first through the Nth automated system 110, 120, 130, 140 is an explicitly programmed automated system while others of the first through the Nth automated systems 110, 120, 130, 140 are cooperating automated systems. It is noted that, in one aspect, the explicitly programmed automated system(s) may be a cooperative automated system for another explicitly programmed automated system to complete a predetermined aspect of an operation to be performed, while in other aspects there is only one explicitly programmed automated system connected to the cooperating automated systems. In one aspect, there may be any suitable ratio of explicitly programmed automated systems to cooperating automated systems such as for example a one to many ratio, a many to one ratio, a one to one ratio, or any other suitable ratio as long as there is at least one explicitly programmed automated system.

Referring to FIGS. 1 and 2, there may be a set of explicit instructions 200S stored in the memory 192 of the controller 190 where the set of explicit instructions 200S includes any suitable number of explicit instructions 200A, 200B, 200C. The one or more of the explicit instructions 200A, 200B, 200C may be programmed into controller 115 of the first automated system 110 as explicit instructions 200 for performing one or more predetermined task. The explicit instructions 200 may include, for example, any suitable process instructions corresponding to one or more discrete task where each discrete task has a beginning and an end. The explicit instructions 200 include, for example, a complete manufacturing plan, motion trajectories for the first robot 111 for each discrete task, locations and vectors corresponding to the discrete task, a sequence of operations for the discrete task, a sequence of performing the discrete tasks (e.g. which discrete task is to be performed before or after another discrete task), and any other suitable information for performing the one or more predetermined task.

The cooperative instructions 201 generated by the controller 125 of the second automated system 120 may be generated based on any suitable process requirements 202 that are stored in the memory 127 of the second automated system 120. In one aspect, the process requirements 202 provide the second automated system 120 with only the automated system processing requirements and a spatial location as to where the automated system processing requirements are to be executed such that the second automated system 120 is free from a manufacturing plan known in the first automated system 110. In one aspect, the controller 190 may include a set of process requirement 202S stored in the memory 192 of the controller 190 where the set of process requirement 202S includes any suitable number of process requirements 202A, 202B, 202C that correspond with one or more of the explicit instructions 200A, 200B, 200C. One or more of the process requirements 202A, 202B, 202C may be programmed into controller 125 of the second automated system 120, in any suitable manner, as process requirements 202 for performing one or more coordinated task that corresponds with a respective one or more predetermined task of the first automated system 110.

In one aspect, the second automated system 120 is in communication with the controller 190 in any suitable manner, such as over a wired or wireless communication link 154. In one aspect, the process requirements 202 are transferred/programmed in the second automated system 120 when corresponding explicit instructions 200 are transferred/programmed in the first automated system 110. In other aspects, the process requirements 202 may be manually programmed into the second automated system 120. In one aspect, the process requirements 202 include, for example, a solid model of the object(s) being worked on, a solid model of the environment being worked in, torque requirements, and/or locations (e.g. x, y, z) and vectors (i, j, k) of specific items to be worked on. As described above, the process requirements 202 do not include any motion profiles, task sequences, and/or explicit programming of the second robot 121.

Referring now to FIGS. 1, 2, 3 and 5 an exemplary operation of the apparatus 100 will be described in accordance with the present disclosure. The exemplary operation will be described with respect to the installation of a first part 250 and a third part 252 onto a second part 251, but the aspects of the present disclosure may be applied to any assembly or manufacturing operation where at least two automated systems cooperate with each other to perform discrete tasks or a series of discrete tasks such as, for example, installation of rivets, welding, inspection and/or positioning of parts for assembly 260. In this example, the first part 250 is a bolt, the third part 252 is a collar to be installed on the first part 250, and the second part 251 comprises a first object 251A and a second object 251B that are to be joined together by the first part 250 and the third part 252. In this example, the first part 250 is inserted through an aperture 251C in the first and second objects 251A, 251B. In one aspect, the assembly 260 may be a part of an aircraft 1102 airframe 1118 and/or cabin 1122 where the first robot 111 and the second robot 121 are separated by and located on opposite sides of the airframe 1118 (such as inside and outside the fuselage), or on separate sides of a wall of the cabin 1122, for installing the first part 250 and the third part 252 on the airframe 1118 or wall of the cabin 1122. In other aspects, the first and second robots 111, 121 may be located on a common side of the assembly 260.

In one aspect, the first automated system 110 is provided and configured for operation where explicit instructions 200 are delivered to the first automated system 110 (FIG. 3, Block 300) in any suitable manner, such as from the controller 190 over communication link 151. In this aspect, the explicit instructions 200 include explicit programming that defines, for example, a complete manufacturing plan that the first automated system follows step by step. For exemplary purposes the complete manufacturing plan may include an identification and location of the first part 250, a torque of the first part 250, the x, y, z coordinates of the center of the aperture 251C and predetermined motion trajectories of at least the end effector for positioning the first part 250 through the aperture 251C. In one aspect, the explicit instructions 200 are such that the first automated system 110 is unaware of how the second automated system 120 accomplishes system actions of the second automated system 120.

In one aspect, the second automated system 120 is also configured for operation where process requirements 202 are delivered to the second automated system 120 (FIG. 3, Block 305) in any suitable manner, such as from controller 190 over communication link 154. In this aspect, the process requirements 202 include, for example, a torque of the third part 252, an identification of the third part 252 and a solid model of the assembly 260 that includes the x, y, z coordinates of the center of the aperture 251C and the normal vector i, j, k of the aperture 251C. In one aspect, the solid model of the assembly includes the environment in which the second robot operates including any parts bins that may contain the third part 252 if the third part is not fed to the end effector 122 by an automated feed device of the second robot 121. In one aspect, the second automated system 120 is unaware of how the first automated system 110 accomplishes system actions performed by the first automated system 110.

Once the first and second automated systems 110, 120 are configured for operation, the first automated system 110 executes the explicit instructions 200 and determines a next action in the explicit instructions 200 (FIG. 3, Block 310). For example, the explicit instructions 200, when executed, may cause the first robot 111 to perform a first discrete system action/operation that includes drilling aperture 251C through the second part 251, positioning the first part 250 on the end effector 112 and positioning the first part 250 in the aperture 251C. When the first discrete operation is completed the first automated system 110 is configured to send the second automated system 120 a process or status message PM1 (FIG. 3, Block 315). In one aspect, the status message PM1 provides an indication of a step in the explicit instructions that the first automated system is actively performing. For example, the status message PM1 informs the second automated system that the first part 250 is positioned within aperture 251C and in essence forms a request to the second automated system to install the third part 252 onto the first part 250.

While the first automated system 110 is performing the first discrete operation the second automated system 120 monitors an operational status of the first automated system 110 (FIG. 3, Block 317). In one aspect, monitoring the operational status of the first automated system 110 includes monitoring, with the second automated system 120, status messages, such as status message PM1, corresponding to an operation of the first automated system 110, sent from the first automated system 110 to the second automated system 120. Based on the status message PM1, the second automated system 120 automatically determines the complementary action, e.g. a second discrete operation/action, (FIG. 3, Block 320) to the insertion of the first part 250 through the aperture 251C, where the complementary action is the discrete operation of installing the third part 252 onto the first part 250. In one aspect, based on the status message PM1 the second automated system 120 visually monitors a task progress of the first automated system 110 with, for example, the vision system 123. For example, in one aspect, the message PM1 may indicate that a task, such as inserting first part 250 into aperture 251C, is being performed by the first automated system 110. The second automated system 120 may visually monitor the aperture 251C for the insertion of the first part 250 through the aperture 251C before commencing the complementary action. In other aspects, the message PM1 indicates to the second automated system that the first part 250 is completely inserted through the aperture 251C so that visually monitoring of the task progress of the first automated system 110 is not needed. In one aspect, the determination of the complementary action includes generating a second system action, with the second automated system, that is complementary to a first system action of the first automated system, where the first system action corresponds to the set of predetermined explicit instructions and the second system action depends on the operational status of the first automated system. In this example, the second automated system 120 uses the information provided in the process requirements 202, independent of the explicit instructions, to generate cooperative instructions 201. The second automated system 120 uses the cooperative instructions 201 to position the third part 252 on the end effector 122, find the aperture 251C, move the end effector 122 to position the third part 252 on the first part 250 and to tighten the third part 252 on the first part 250 with the specified torque. In one aspect, generating the cooperative instructions 201 (also referred to as a second system action) includes calculating, with the second automated system 120, a motion trajectory of the second automated system 120 based on the operational status of the first automated system 110 in real time. For example, the second automated system 120 utilizes any suitable automatic just-in-time trajectory planning algorithms to generate the motion trajectories of the second robot 121, utilizing the vision system 123 as necessary to identify the aperture 251C or other portions of the assembly 260, as well as utilizing the vision system to identify and select, for example, a predetermined third part 252 (e.g. collar for the bolt) for performing the complementary action so that the second automated system 120 cooperates with the first automated system 110 to perform a predetermined operation. The second controller 125 of the second automated system 120 may be configured to perceive a torque value and the identity (e.g. size and type) of the first part (e.g. bolt) from, for example, at least the messages sent to the second automated system 120 from the first automated system 110, while in other aspects values, such as torque values, may be include in a table stored in memory 127 where the torque values are correlated to a location of the operation or a size/type of the third part 252. The second automated system 120 performs the cooperative instructions and cooperates with the first automated system 110 for installing the third part 252 on the first part 250 and when completed (FIG. 3, Block 325) the second automated system sends a status message PM2 to the first automated system 110 (FIG. 3, Block 330) informing the first automated system 110 that the installation of the third part 252 is complete.

While the second automated system 120 is performing the second discrete operation the first automated system 110 monitors an operational status of the second automated system 120 (FIG. 3, Block 333). In one aspect, monitoring the operational status of the second automated system 120 includes monitoring, with the first automated system 110, status messages, such as status message PM2, corresponding to an operation of the second automated system 120, sent from the second automated system 120 to the first automated system 110. In one aspect, the operational status messages (e.g. the status messages PM1, PM2) passed between the first automated system and the second automated system effect a progression of the explicit instructions with the first automated system. For example, upon receipt of the status message PM2, the first automated system 110 determines if the last action in the explicit instructions 200 is completed (FIG. 3, Block 335). If the last action in the explicit instructions 200 is not completed, such as if other bolts and collars are to be installed in accordance with the manufacturing plan, the first automated system 110 determines the next action in the explicit instructions and blocks 310-335 of FIG. 3 are repeated until all action in the explicit instructions 200 are completed. When it is determined by the first automated system 110 that all actions in the explicit instructions are completed the instructions are terminated (FIG. 3, Block 340) and the assembly 260 is complete.

In the aspects of the present disclosure, the second automated system 120 is a reactive system that reacts to the actions of the first automated system 110 without any explicit programming or knowledge of the complete manufacturing plan, e.g., the second automated system 120 operates free from a set of operating instructions that correspond with the explicit instructions of the first automated system 110. As such, if the programming of the first automated system 110 is changed there is no additional programming or reprogramming of the second automated system 120 needed to account for the change in programming of the first automated system 110. This provides for less assembly down time that would result from the extensive time is takes to reprogram each robot in the automated assembly cell 180 as with conventional systems because, in the aspects of the present disclosure only the non-reactive automated system, such as the first automated system 110, include explicit programming. The Aspects of the disclosed embodiment also provide for automatic synchronization between the first and second automated systems 110, 120 due to, for example, the passages of status messages between the first and second automated systems 110, 120 after each discrete operation of a respective one of the first and second automated systems 110, 120. Further, if the first automated system 110 fails to perform one of the predetermined actions defined by the explicit instructions 200 the second automated system will not generate an error as the second automated system 120 will only generate and perform an action that is complementary to an action of the first automated system 110 when the second automated system 120 receives a status message PM1 from the first automated system 110, where the first automated system 110 only sends the status message PM1 when the predetermined action(s) are completed.

Examples of the present disclosure may be described in the context of aircraft manufacturing and service method 1100 as shown in FIG. 4 and aircraft 1102 as shown in FIG. 5. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 5, aircraft 1102 produced by illustrative method 1100 may include airframe 1118 with a plurality of high-level systems 1120 and interior or cabin 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to the assembly and/or repair of other vehicles or structures that require cooperation between multiple automated systems.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

A. A method of coordinating automated systems, the method comprising: providing a first automated system that is programmed with a set of predetermined operating instructions that correspond with automated system processing requirements; monitoring an operational status of the first automated system with a second automated system; automatically generating a second system action, with the second automated system, that is complementary to a first system action of the first automated, where the first system action corresponds to the set of predetermined operating instructions and the second system action depends on the operational status of the first automated system; and performing the second system action with the second automated system so that the second automated system cooperates with the first automated system to perform a predetermined operation.

A1. The method of paragraph A, wherein monitoring the operational status of the first automated system includes monitoring, with the second automated system, status messages corresponding to an operation of the first automated system, sent from the first automated system to the second automated system.

A2. The method of paragraph A1, wherein the status messages comprise an indication of a step in the operating instructions that the first automated system is actively performing.

A3. The method of paragraph A1, further comprising monitoring an operational status of the second automated system, with the first automated system, where the first automated system monitors status messages corresponding to an operation of the second automated system, sent from the second automated system to the first automated system.

A4. The method of paragraph A, wherein generating the second system action includes calculating, with the second automated system, a motion trajectory of the second automated system based on the operational status of the first automated system in real time.

A5. The method of paragraph A4, wherein the second automated system calculates the motion trajectory of the second automated system independent of the set of predetermined operating instructions.

A6. The method of paragraph A, wherein the second automated system operates free from a set of operating instructions that correspond with the set of predetermined operating instructions.

A7. The method of paragraph A, wherein operational status messages are passed between the first automated system and the second automated system to effect a progression of the set of operating instructions with the first automated system.

A8. The method of paragraph A, further comprising providing the second automated system with only the automated system processing requirements and a spatial location as to where the automated system processing requirements are to be executed such that the second automated system is free from a manufacturing plan known in the first automated system.

A9. The method of paragraph A, wherein the second automated system is unaware of how the first automated system accomplishes the first system action.

A10. The method of paragraph A, wherein the first automated system is unaware of how the second automated system accomplishes the second system action.

A11. The method of paragraph A, wherein monitoring an operational status of the first automated system includes visually monitoring a task progress of the first automated system with the second automated system.

B. A coordinated automated system comprising: a first automated system having a controller that is programmed with a set of predetermined operating instructions that correspond with automated system processing requirements; and a second automated system having a controller configured to monitor an operational status of the first automated system, automatically generate a second system action that is complementary to a first system action of the first automated system, where the first system action corresponds to the set of predetermined operating instructions and the second system action depends on the operational status of the first automated system, and effect operation of the second automated system so that the second automated system cooperates with the first automated system to perform a predetermined operation.

B1. The system of paragraph B, wherein the controller of the second automated system is configured to monitor status messages corresponding to an operation of the first automated system, sent from the first automated system to the second automated system.

B2. The system of paragraph B1, wherein the status messages comprise an indication of a step in the operating instructions that the first automated system is actively performing.

B3. The system of paragraph B1, wherein the controller of the first automated system is configured to monitor an operational status of the second automated system, where the first automated system monitors status messages corresponding to an operation of the second automated system, sent from the second automated system to the first automated system.

B4. The system of paragraph B, wherein the controller of the second automated system is configured to generate the second system action by calculating a motion trajectory of the second automated system based on the operational status of the first automated system in real time.

B5. The system of paragraph B4, wherein the controller of the second automated system is configured to calculate the motion trajectory of the second automated system independent of the set of predetermined operating instructions.

B6. The system of paragraph B, wherein the second automated system operates free from a set of operating instructions that correspond with the set of predetermined operating instructions.

B7. The system of paragraph B, wherein the first automated system is configured to progress through the predetermined set of operational instructions in response to status messages passed from the second automated system to the first automated system.

B8. The system of paragraph B, wherein the controller of the second automated system is programmed with only the automated system processing requirements and a spatial location as to where the automated system processing requirements are to be executed such that the second automated system is free from a manufacturing plan known in the first automated system.

B9. The system of paragraph B, wherein the second automated system is unaware of how the first automated system accomplishes the first system action.

B10. The system of paragraph B, wherein the first automated system is unaware of how the second automated system accomplishes the second system action.

C. An automated assembly system comprising: a first automated system having a controller that is programmed with a set of predetermined operating instructions that correspond with automated assembly requirements; and a second automated system having a controller configured to monitor an operational status of the first automated system, automatically generate a second system action that is complementary to a first system action of the first automated system, where the first system action corresponds to the set of predetermined operating instructions and the second system action depends on the operational status of the first automated system, and effect operation of the second automated system so that the second automated system cooperates with the first automated system to perform a predetermined assembly operation.

C1. The system of paragraph C, wherein the controller of the second automates system is configured to monitor status messages corresponding to an assembly operation of the first automated system, sent from the first automated system to the second automated system.

C2. The system of paragraph C1, wherein the status messages comprise an indication of a step in the operating instructions that the first automated system is actively performing.

C3. The system of paragraph C1, wherein the controller of the first automated system is configured to monitor an operational status of the second automated system, where the first automated system monitors status messages corresponding to an assembly operation of the second automated system, sent from the second automated system to the first automated system.

C4. The system of paragraph C, wherein the controller of the second automated system is configured to generate the second system action by calculating a motion trajectory of the second automated system based on the operational status of the first automated system in real time.

C5. The system of paragraph C4, wherein the controller of the second automated system is configured to calculate the motion trajectory of the second automated system independent of the set of predetermined operating instructions.

C6. The system of paragraph C, wherein the second automated system operates free from a set of operating instructions that correspond with the set of predetermined operating instructions.

C7. The system of paragraph C, wherein the first automated system is configured to progress through the predetermined set of operational instructions in response to status messages passed from the second automated system to the first automated system.

C8. The system of paragraph C, wherein the controller of the second automated system is programmed with only the automated assembly requirements and a spatial location as to where the automated assembly requirements are to be executed such that the second automated system is free from a manufacturing plan known in the first automated system.

C9. The system of paragraph C, wherein the second automated system is unaware of how the first automated system accomplishes the first system action.

C10. The system of paragraph C, wherein the first automated system is unaware of how the second automated system accomplishes the second system action.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of coordinating automated systems, the method comprising:
   providing a first automated system that is programmed with a set of predetermined operating instructions that correspond with automated system processing requirements;
   monitoring an operational status of the first automated system with a second automated system;
   automatically generating a second system action, with the second automated system, that is complementary to a first system action of the first automated system, where the first system action corresponds to the set of predetermined operating instructions and the second system action includes an unscripted cooperative task that depends on the operational status of the first automated system; and
   performing the second system action with the second automated system based on the unscripted cooperative task so that the second automated system cooperates with the first automated system to perform a common cooperative predetermined operation where each of the first automated system and the second automated system performs a respective portion of the common cooperative predetermined operation.

2. The method of claim 1, wherein monitoring the operational status of the first automated system includes monitoring, with the second automated system, status messages corresponding to an operation of the first automated system, sent from the first automated system to the second automated system.

3. The method of claim 2, wherein the status messages comprise an indication of a step in the operating instructions that the first automated system is actively performing.

4. The method of claim 2, further comprising monitoring an operational status of the second automated system, with the first automated system, where the first automated system monitors status messages corresponding to an operation of the second automated system, sent from the second automated system to the first automated system.

5. The method of claim 1, wherein generating the second system action includes calculating, with the second automated system, a motion trajectory of the unscripted cooperative task of the second automated system based on the operational status of the first automated system in real time.

6. The method of claim 5, wherein the second automated system calculates the motion trajectory of the second automated system independent of the set of predetermined operating instructions.

7. The method of claim 1, wherein operational status messages are passed between the first automated system and the second automated system to effect a progression of the set of operating instructions with the first automated system.

8. The method of claim 1, further comprising providing the second automated system with only the automated system processing requirements and a spatial location as to where the automated system processing requirements are to be executed such that the second automated system is free from a manufacturing plan known in the first automated system.

9. A coordinated automated system comprising:
   a first automated system having a controller that is programmed with a set of predetermined operating instructions that correspond with automated system processing requirements; and
   a second automated system having a controller configured to
      monitor an operational status of the first automated system,
      automatically generate a second system action that is complementary to a first system action of the first automated system, where the first system action corresponds to the set of predetermined operating instructions and the second system action includes an unscripted cooperative task that depends on the operational status of the first automated system, and
      effect operation of the second automated system based on the unscripted cooperative task so that the second automated system cooperates with the first automated system to perform a common cooperative predetermined operation where each of the first automated system and the second automated system performs a respective portion of the common cooperative predetermined operation.

10. The system of claim 9, wherein the controller of the second automated system is configured to monitor status messages corresponding to an operation of the first automated system, sent from the first automated system to the second automated system.

11. The system of claim 10, wherein the status messages comprise an indication of a step in the operating instructions that the first automated system is actively performing.

12. The system of claim 10, wherein the controller of the first automated system is configured to monitor an operational status of the second automated system, where the first automated system monitors status messages corresponding to an operation of the second automated system, sent from the second automated system to the first automated system.

13. The system of claim 9, wherein the controller of the second automated system is configured to generate the second system action by calculating a motion trajectory of the unscripted cooperative task of the second automated system based on the operational status of the first automated system in real time.

14. The system of claim 9, wherein the second automated system operates free from a set of operating instructions that correspond with the set of predetermined operating instructions.

15. An automated assembly system comprising:
   a first automated system having a controller that is programmed with a set of predetermined operating instructions that correspond with automated assembly requirements; and
   a second automated system having a controller configured to
      monitor an operational status of the first automated system,
      automatically generate a second system action that is complementary to a first system action of the first automated system, where the first system action corresponds to the set of predetermined operating instructions and the second system action includes an unscripted cooperative task that depends on the operational status of the first automated system, and effect operation of the second automated system based on the unscripted cooperative task so that the second automated system cooperates with the first automated system to perform a common cooperative predetermined assembly operation where each of the first automated system and the second automated system performs a respective portion of the common cooperative predetermined assembly operation.

16. The system of claim 15, wherein the controller of the second automates system is configured to monitor status messages corresponding to an assembly operation of the first automated system, sent from the first automated system to the second automated system.

17. The system of claim 16, wherein the status messages comprise an indication of a step in the operating instructions that the first automated system is actively performing.

18. The system of claim 16, wherein the controller of the first automated system is configured to monitor an operational status of the second automated system, where the first automated system monitors status messages corresponding to an assembly operation of the second automated system, sent from the second automated system to the first automated system.

19. The system of claim 15, wherein the controller of the second automated system is configured to generate the second system action by calculating a motion trajectory of the unscripted cooperative task of the second automated system based on the operational status of the first automated system in real time.

20. The system of claim 15, wherein the second automated system operates free from a set of operating instructions that correspond with the set of predetermined operating instructions.

* * * * *

UNITED STATES PATENT AND TRADEMARK OFFICE
CERTIFICATE OF CORRECTION

PATENT NO. : 10,268,177 B2  
APPLICATION NO. : 15/158880  
DATED : April 23, 2019  
INVENTOR(S) : Freeman et al.

Page 1 of 1

It is certified that error appears in the above-identified patent and that said Letters Patent is hereby corrected as shown below:

In the Claims

Column 15, Claim 1, Line 14, delete "that is programmed"  
Column 15, Claim 1, Line 15, delete "with a set of predetermined"  
Column 15, Claim 1, Line 23, delete "the first system action corresponds to the set of prede-"  
Column 15, Claim 1, Line 24, delete "termined operating instructions and"  
Column 16, Claim 9, Line 5, delete "that is pro-"  
Column 16, Claim 9, Line 6, delete "grammed with a set of predetermined operating instruc-"  
Column 16, Claim 9, Line 7, delete "tions that correspond with automated system process-"  
Column 16, Claim 9, Line 8, delete "ing requirements"  
Column 16, Claim 9, Line 15, delete "the first system action"  
Column 16, Claim 9, Line 16, delete "corresponds to the set of predetermined operating"  
Column 16, Claim 9, Line 17, delete "instructions and"  
Column 16, Claim 14, Line 50, delete "the" and insert -- a --, delete "predetermined"  
Column 16, Claim 14, Line 51, insert -- of the first automated system. --  
Column 16, Claim 15, Line 53, delete "that is pro-"  
Column 16, Claim 15, Line 54, delete "grammed with a set of predetermined operating instruc-"  
Column 16, Claim 15, Line 55, delete "tions that correspond with automated assembly require-"  
Column 16, Claim 15, Line 56, delete "ments"  
Column 16, Claim 15, Line 63, delete "the first system action"  
Column 16, Claim 15, Line 64, delete "corresponds to the set of predetermined operating"  
Column 16, Claim 15, Line 65, delete "instructions and"  
Column 18, Claim 20, Line 15, delete "the" and insert -- a --, delete "predetermined"  
Column 18, Claim 20, Line 16, insert -- of the first automated system. --

Signed and Sealed this  
Seventeenth Day of September, 2019

Andrei Iancu  
*Director of the United States Patent and Trademark Office*